United States Patent [19]

Takahashi et al.

[11] Patent Number: 4,543,050

[45] Date of Patent: Sep. 24, 1985

[54] TIRE MANUFACTURING MOLD

[75] Inventors: Kenichi Takahashi, Kodaira; Koichi Hirano, Akigawa; Shoji Futamura, Kawasaki, all of Japan

[73] Assignees: Bridgestone Tire Co. Ltd.; Institute of Technology Precision Electrical Discharge Works, both of Japan

[21] Appl. No.: 499,913

[22] Filed: Jun. 1, 1983

Related U.S. Application Data

[63] Continuation of Ser. No. 247,280, Mar. 25, 1981, abandoned.

[30] Foreign Application Priority Data

Apr. 4, 1980 [JP] Japan .................................. 55-44395

[51] Int. Cl.⁴ ............................................. B29H 5/02
[52] U.S. Cl. .................................... 425/28 D; 425/37
[58] Field of Search ................... 425/28 R, 28 D, 31, 425/32, 33, 35, 36, 37, 46, 47; 219/69 M

[56] References Cited

U.S. PATENT DOCUMENTS

| | | | |
|---|---|---|---|
| 2,732,589 | 1/1956 | Steadman | 425/28 D X |
| 2,736,924 | 3/1956 | Bean | 425/28 D |
| 2,756,460 | 7/1956 | Heinz, Jr. | 425/28 D |
| 3,283,053 | 11/1966 | Felker | 425/28 D X |
| 3,432,888 | 3/1969 | Brierley | 425/28 D |
| 3,553,790 | 1/1971 | Brobeck et al. | 425/35 |
| 3,694,610 | 9/1972 | Saito et al. | 219/69 M |
| 3,777,595 | 12/1973 | Hausermann et al. | 219/69 M X |
| 4,154,564 | 5/1979 | French | 425/28 D |

FOREIGN PATENT DOCUMENTS

| | | | |
|---|---|---|---|
| 588170 | 5/1947 | United Kingdom | 425/47 |
| 867556 | 5/1961 | United Kingdom | 425/28 D |

Primary Examiner—Jan Silbaugh
Attorney, Agent, or Firm—McGlew and Tuttle

[57] ABSTRACT

A tire manufacturing mold having a contour surface consisting of a predetermined curved surface corresponding to the outer circumferential surface of a tire being molded, a plurality of bone portions and blade portions, both protruding on the contour surface, and a manufacturing method of the same are disclosed. The tire manufacturing mold is manufactured by discharge machining in such a manner that the blade portions are caused to protrude essentially vertically to the contour surface, and that the contour surface, the bone portions and the blade portions are integrally formed.

4 Claims, 11 Drawing Figures

TIRE MANUFACTURING MOLD

This is a continuation of application Ser. No. 247,280, filed Mar. 25, 1981, now abandoned.

BACKGROUND OF THE INVENTION

1. Field of the Invention

This invention relates generally to a tire manufacturing mold and a manufacturing method therefor, and more particularly to a tire manufacturing mold and a manufacturing method, based on discharge machining, in which a contour surface of the mold consisting of a predetermined curved surface corresponding to the outer circumferential surface of a tire being molded and bone portions and blade portions, both protruding on the contour surface, are integrally formed by discharge machining.

2. Description of the Prior Art

In manufacturing a tire manufacturing mold, plate-like protrusions (hereinafter referred to as blades) corresponding to grooves as commonly found of the tread surface of a tire must be formed on the tire mold. It is extremely difficult, however, to machine such blades on a tire metal mold with a cutting operation, discharge machining, etc. in such a fashion that the blades are integrally formed with the mold proper. Heretofore, therefore, the following method has been commonly used. That is, (i) Molds of the same size and shape as the segments obtained by radially dividing a tire being molded are prepared, using gypsum, for example, on the assumption that there exist no grooves on the tire.

(ii) Metal pieces, for example, having the same cross-sectional shape as the grooves and a predetermined height are fitted, using adhesive and other appropriate means, on the gypsum models at positions corresponding to those of the grooves on the tire. Using these gypsum models as matrices, n pieces of their reversed molds are prepared with resin, etc.

(iii) Blades, made of stainless steel, etc., of a predetermined height are inserted into all the grooves formed on the reversed molds by the metal pieces. The predetermined height of the blade is such that the height of the blade excluding the portion being inserted into the groove is equal to the height of the blade being provided on the tire mold.

(iv) Gypsum is poured into the reversed molds with the blades and allowed to cure. Thus, gypsum casting molds are obtained by removing the reversed molds. At this time, the blades inserted in the reversed molds are moved to the casting molds with the portion thereof previously inserted in the reversed mold exposed on the casting mold.

(v) The gypsum casting molds thus formed are arranged in a ring shape and used as a matrix for molding the desired tire manufacturing mold with aluminum precision molding, for example.

With this method, the portion of the blade previously exposed on the casting mold is embedded in the tire manufacturing mold with the portion thereof previously embedded in the gypsum casting mold exposed on the tire manufacturing mold.

Another method of providing blades on a tire manufacturing mold is as follows.

Tire manufacturing metal molds without blade portions are first manufactured. And then, grooves corresponding to the cross-sectional shape of the blades are formed on the corresponding positions of the molds by manual metalworking or discharge machining, and prefabricated blades are embedded in these grooves.

These conventional methods, as described above, involve complex manufacturing processes, resulting in increased manufacturing costs. In addition, embedded blades are very likely to become loosened, coming off in some cases.

SUMMARY OF THE INVENTION

It is an object of this invention to provide a tire manufacturing mold manufactured by electrodischarge machining in such a manner that a contour surface, bone portions and blade portions corresponding to the outer circumferential surface of the tire being molded are integrally formed, and the manufacturing method thereof.

It is another object of this invention to provide a tire manufacturing mold manufactured by electrodischarge machining, which can contribute to reduction of manufacturing costs through labor saving in the manufacture of metal molds, and the manufacturing method thereof.

It is still another object of this invention to provide a tire manufacturing mold in which blade portions are integrally formed with the mold proper by electrodischarge machining so as to prevent the blade portions from coming off and thereby to increase the mechanical strength of the mold.

DETAILED DESCRIPTION OF THE INVENTION

Figure 1:
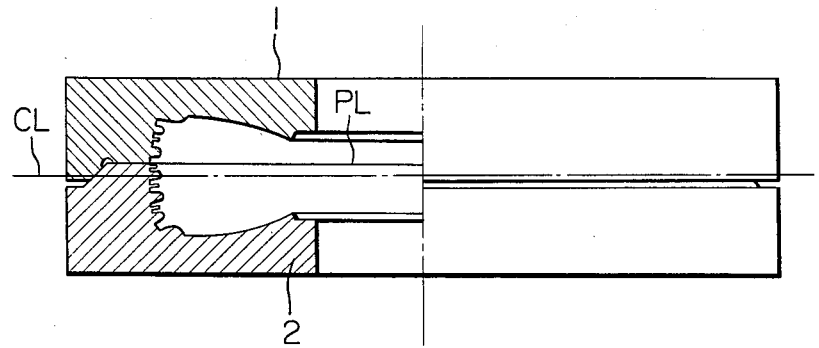
FIG. 1 is a cross-sectional side elevation of a tire manufacturing mold embodying this invention.
Figure 2:
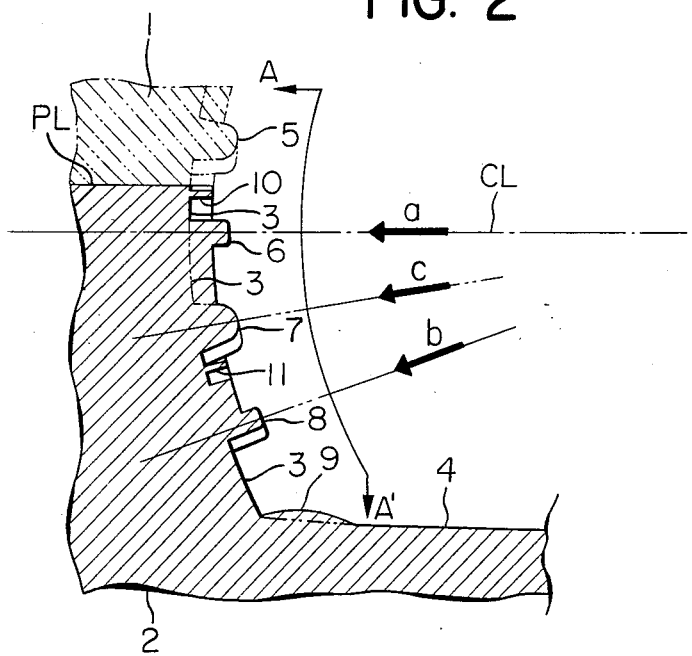
FIG. 2 is a partially enlarged cross-section of the lower half of the mold shown in FIG. 1.
Figure 3:
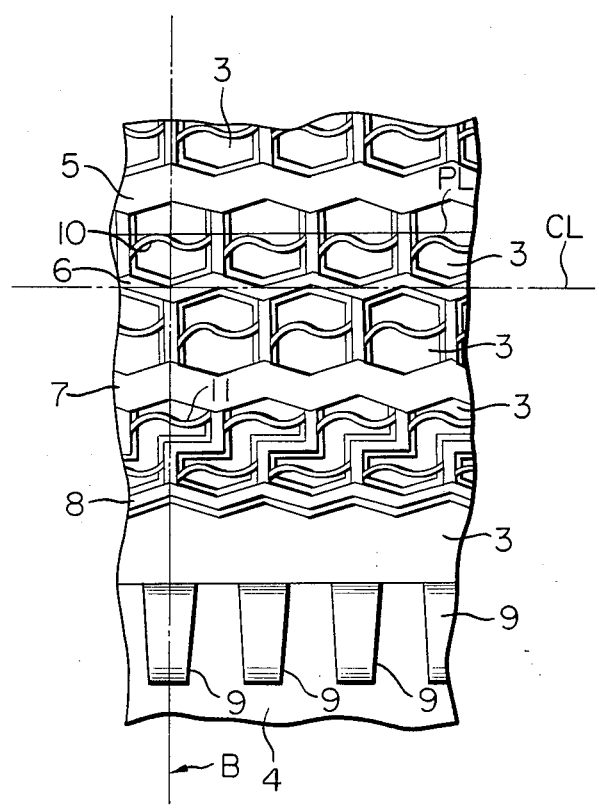
FIG. 3 is a developed plan view taken substantially along the line A—A' in FIG. 2.

An example of the tire manufacturing mold being manufactured by this invention is shown in FIGS. 1 through 3.

In the figures, reference numeral 1 refers to an upper-half mold; 2 to a lower-half mold; 3 to a contour surface corresponding to the tread surface of the tire being molded; 4 to a shoulder portion; 5 through 9 to bone portions; 10 and 11 to blade portions; PL to a parting line at which the upper-half mold and the lower-half mold are matched together; and CL to a center line corresponding to the center line of the tread surface of the tire being molded.

Next, an example of the electrodischarge machining equipment used for the manufacture of the tire manufacturing mold of this invention will be described, referring to FIGS. 4A and 4B.

Figure 4A:
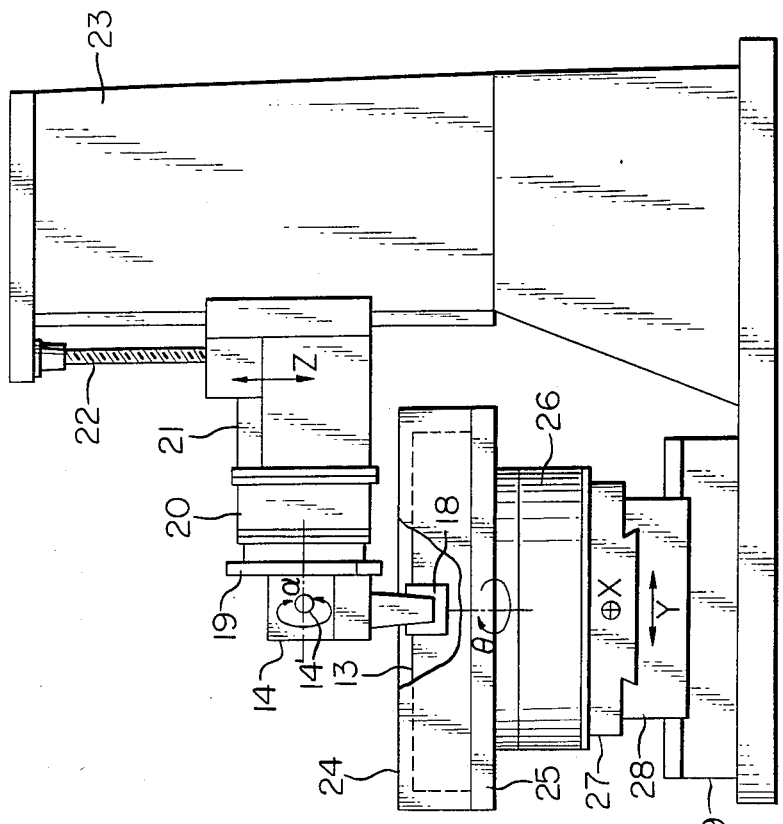
FIGS. 4A and 4B are a front view and side view, respectively, of an example of the electrodischarge machining equipment for use in this invention.
Figure 4B:
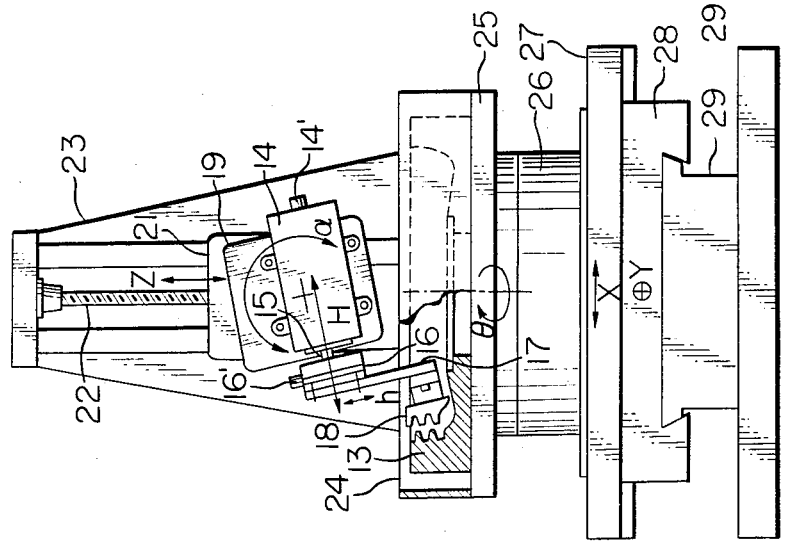

In FIGS. 4A and 4B, numeral 13 refers to a work or workpiece; 14 to a first machining head for feeding a machining electrode in the direction shown by arrow H in the figure; 14' to a pulse motor of the first machining head 14; 15 to a spindle of the first machining head 14; 16 to a second machining head for feeding a machining head in the direction shown by arrow h in the figure; 16' to a pulse motor of the second machining head 16; 17 to a machining electrode mounting jig; 18 to a machining electrode; 19 to a head support for supporting the first machining head 14; 20 to a head rotating drive unit for rotating the head support 19, together with the first machining head 14 in the direction shown by arrow α in the figure; 21 to a carriage which is supported by a column 23 and can be lifted and lowered by a lead screw 22 in the direction shown by arrow Z in the figure; 24 to a electrolyte tank; 25 to a machining table on which the work 13 is placed; 26 to a table rotating drive unit for rotating (servo-driving) the machining table 25 in the direction shown by arrow $\frac{1}{4}$ in the figure by means of, for example a pulse motor or hydraulic-drive unit; 27 to a first table for moving the machining table 25, together with table rotating drive unit 26, in the direction shown by arrow X in the figure; 28 to a second table for moving the first table 27 in the direction shown by arrow Y in the figure; and 29 to a bed, respectively.

In FIGS. 4A and 4B illustrating an example of the electrodischarge machining equipment for use in this invention, the first machining head 14 drives the spindle 15 in the direction shown by arrow H in the figure by means of the pulse motor 14'. At the tip of the spindle 15 is fixed the second machining head 16, which drives the machining electrode 18 in the direction shown by arrow h in the figure by the pulse motor 16' via the electrode mounting jig 17. As the operation of the second machining head 16 will be described later, the description here is based on the assumption that the second machining head is in a still state. The movement of the spindle 15 in the direction H by the pulse motor 14' of the first machining head 14 is controlled in such a manner that the gap between the machining electrode 18 and the work 13 can be maintained constant with the progress of machining in accordance with predetermined machining conditions such as electrode voltage, discharge current, etc. (hereinafter referred to as automatic servo-drive). In place of the pulse motors 14' and 16' for driving the first and second machining heads 14 and 16, a hydraulic servo-drive unit and other appropriate automatic servo drive units may be used.

The electrodischarge machining equipment for use in this invention, as shown in FIGS. 4A and 4B, is capable of setting the angle of the first machining head 14 in the direction H, that is, the angle of the machining electrode 18 in the automatic control feed direction with respect to the machining table 25 at a desired angle through the rotation of the head support 19 in the direction α, the lifting and lowering of the carriage 21 in the direction Z, and the rotation in the direction θ and the movement in the directions X and Y of the machining table 25. At the same time, the electrodischarge machining equipment is also capable of setting the machining position of the electrode 18 for discharge machining the work 13 at any desired position. The detailed description of the positioning method of the work 13 and the electrode 18, which has already been proposed by the present inventors in the U.S. Ser. No. 126,199, now U.S. Pat. No. 4,409,457, is omitted here.

Next, this invention will be described, with particular reference to the lower-half mold 2 of the tire manufacturing mold shown in FIGS. 1 through 3.

In general, a tire has on the tread surface thereof a plurality of grooves formed essentially vertically to the tread surface. Consequently, on a metal mold for molding such a tire, for example, the lower-half mold 2 as shown in FIG. 2, is provided with the bone portions 6 and 8 and the blade portions 10 and 11 which protrude virtually vertically to the contour surface thereof, corresponding to the aforementioned grooves.

In discharge machining a mold such as the lower-half mold 2 shown in FIG. 2 the contour surface of which has a plurality of projections formed vertically to the contour surface, the feeding of a machining electrode (not shown) in any direction, for example, in any of the directions shown by arrows a, b and c in FIG. 2 would result in unwanted metal removal on any of the bone portions 6 and 8 and the blade portions 10 and 11.

To overcome such unwanted metal removal, the feeding direction of the machining electrode is made changeable between the direction coinciding with the protruding direction of the bone portion 6 and the blade portion 10 and the direction b coinciding with the protruding direction of the bone portion 8 and the blade portion 11. Thus, the first-stage discharge machining is performed by using different machining electrodes having such profiles as to prevent the aforementioned unwanted metal removal for each discharge machining in the electrode feeding directions a and b. The first-stage discharge machining will be described in the following, referring to FIGS. 5A through 5C. In the figures, numerals 2, 3, 6 through 11, 13 and 17 correspond with like numerals in FIGS. 1 through 4. Numerals 18a and 18b refer to first-stage machining electrodes; 3a and 3b to electrode contour surfaces; 6a through 11a to electrode recesses formed on the machining surface of the first-stage machining electrode 18a; and through 11b to electrode recesses formed on the machining surface of the first-stage machining electrode 18b, respectively.

Figure 5A:
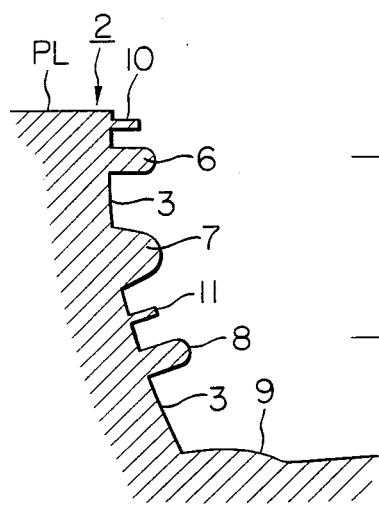
FIGS. 5A through 5C are sectional diagrams which are useful in explaining the first-stage discharge machining in the manufacturing process of the tire manufacturing mold of this invention.

FIG. 5A is a crosssection of the final profile of the lower-half mold 2 to be manufactured in the invention.

Figure 5B:
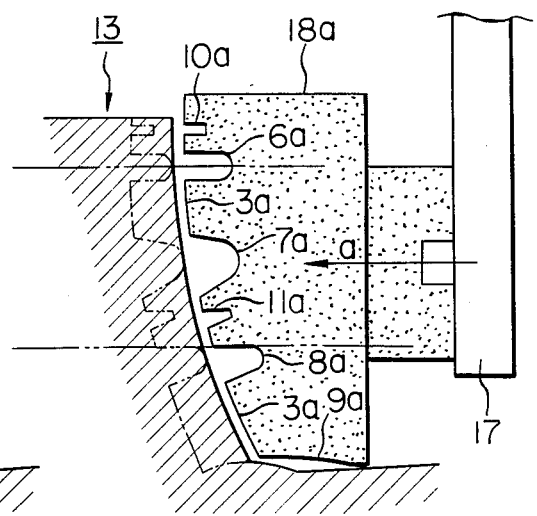

FIG. 5B shows the first-stage machining electrode 18a used for machining in the direction a.

Figure 5C:
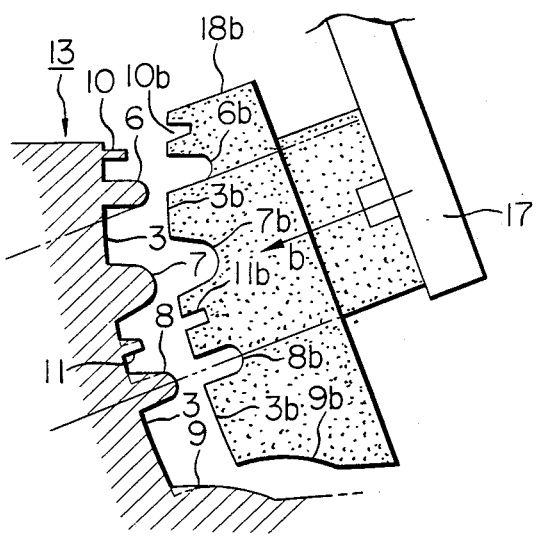

FIG. 5C shows the first-stage machining electrode 18b used for machining in the direction b. The first-stage machining electrode 18a for machining in the direction a has a profile corresponding to that of the lower-half mold shown in FIG. 5A, except for the electrode recesses 8a, 9a and 11a having such profiles as to prevent unwanted metal removal, as shown in FIG. 5b. Similarly, the first-stage machining electrode 18b for machining in the direction b has a profile corresponding to that of the lower-half mold 2 except for the electrode recesses 6b and 10b having such profiles as to prevent unwanted metal removal, as shown in FIG. 5C. The manufacturing method and device of the first-stage machining electrodes 18a and 18b have already proposed by the present inventors in the U.S. Ser. No. 126,199, so the detailed description of them is omitted here.

In the first-stage discharge machining according to this invention, the work 13 is first machined into a profile as shown by a dotted line in FIG. 5B by feeding the first-stage machining electrode 18a, positioned at a location shown in the figure, in the direction a. Then, using the first-stage machining electrode 18b in place of the electrode 18a, discharge machining is performed in the direction b to remove the portions shown by dotted line in FIG. 5C, which are left unmachined in the machining process shown in FIG. 5B, on the bone portions 8 and 9 and the blade portions 11. With this process, as shown in FIG. 5C, the desired profile of the lower-half mold 2 shown in FIG. 5A is obtained. The aforementioned first-stage discharge machining process can produce the desired profile of the lower-half mold 2 shown in FIG. 5A without causing unwanted metal removal on projections since the recesses 8a, 9a and 11a of the first-stage machining electrode 18a for use in the a-direction machining and the recesses 6b and 10b of the first-stage machining electrode 18b for use in the b-direction machining are formed into profiles shown in FIGS. 5B and 5C.

Figure 6A:
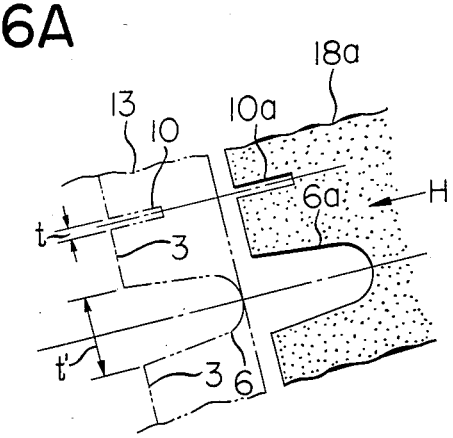
FIGS. 6A through 6C are sectional diagrams which are useful in explaining the second-stage electrodischarge machining in the manufacturing process of this invention.
Figure 6B:
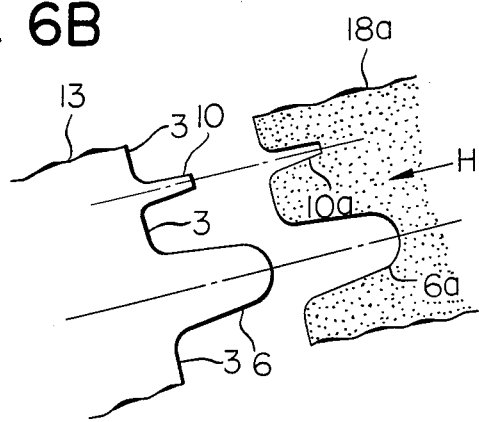

In practice, however, it is difficult to obtain the desired profile even with the aforementioned discharge machining process because there are some problems such as the wear of electrode caused with the progress of discharge machining and overcuts caused by secondary discharge by metal chips suspending in the discharge gap between the machining electrode and the work, as shown in FIGS. 6A and 6B. That is, when discharge machining (the first-stage discharge machining as described above) is carried out by feeding the first-stage machining electrode 18a having a profile corresponding to the desired profile as shown by a dotted line in the work 13 in FIG. 6A in the direction shown by arrow H in the figure by means of the first machining head 14 (shown in FIG. 4A), the work 13 will be formed into a profile shown in FIG. 6B. That is, the corners at which the contour surface 3 and each side surface of the bone protion 6 and the blade portion 10 intersect tend to be slightly rounded. This is caused by the fact that the edges of the mouths of the recesses 6a and 10a wear out and become rounded since the wear of an electrode occurs most pronouncedly at protrusions or corners on the electrode surface, as is generally known. Furthermore, the blade portion 10 tends to be tapered off toward the end thereof. This is due to the so-called overcut caused by secondary discharge by metal chips in the discharge gap.

It is necessary, therefore, to take into account this point in determining the profile of the recess 10a (shown in FIG. 6A) of the machining electrode 18a used for the first-stage machining. In this invention, the second-stage discharge machining as will be described in the following is performed on the work 13 shown in FIG. 6B after the first-stage discharge machining to obtain the desired profile as shown by a dotted line in FIG. 6A.

Figure 6C:
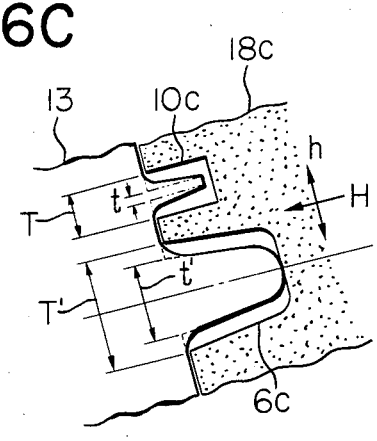

FIG. 6C is a diagram which is useful for explaining the second-stage discharge machining. In the figure, numeral 18c refers to a second-stage machining electrode; 6c and 10c to electrode recesses provided for finish machining the bone portion 6 and the blade portion 10, respectively. The second-stage machining electrode 18c can be obtained by machining the side walls of the recesses 10a and 6a of the first-stage machining electrode 18a shown in FIG. 6B to widen the side walls of the recesses to such an extent that the rounded parts at the corners can be removed. The center lines of the recesses 10c and 6c thus formed are required to align with the center lines of the recesses 10a and 6a of the first-stage machining electrode 18a. Needless to say, the second-stage machining electrode 18c is not limited to the one obtained by enlarging the widths of the recesses 10a and 6a of the first-stage machining electrode 18a, but may be a separately prepared electrode of the same profile.

By using the second-stage machining electrode 18c which is machined into such a profile to satisfy an equation $(T-t=T'-t')$, where T and T' are the widths of the openings of the recesses 10c and 6c, and t and t' are the finally finished widths of the blade portion 10 and the bone portion 6 shown by dotted lines in FIGS. 6A and 6C, the blade portion 10 and the bone portion 6 can be finished simultaneously with the second-stage discharge machining, which will be described later.

As shown in FIG. 6C, the second-stage discharge machining is performed in the following manner. The second-stage machining electrode 18c is first fed in the direction H by means of the first machining head 14, and then automatic servo driven by a distance $(T-t)/2$ in any one of the directions h by means of the second machining head 16 (shown in FIG. 4A). And then, the second-stage machining electrode 18c is automatic servo driven by a distance $(T-t)$ in the other direction of the direction h to remove the metal left unmachined on the other side. As a result, the blade portion 10 and the bone portion 6 of the work 13 can be finished into the desired profile shown by a dotted line in FIG. 6A. The feeding distance of the second-stage machining electrode 18c in the directions H and h during the second-stage discharge machining can be set to a predetermined range by means of, for example, limit switches. That is, the automatic servo driving of the machining electrode 18c in the direction H is effected by the first machining head 14 until a limit switch (not shown) is actuated. When the limit switch is actuated, the feeding of the machining electrode 18c is stopped and the automatic servo driving of the electrode 18c in the direction h is started by the second machining head 16. If the electrode 18c and the work 13 are shortcircuited during the h-direction machining, the machining electrode 18c is immediately retreated by a predetermined distance in the opposite directions to the directions H and h. The retreat distance can also be set by presetting, for example the number of pulses fed to the machining heads 14 and 16. Needless to say, the machining electrode 18c, once retreatd, is fed again in the direction H and then in the direction h to continue discharge machining. The retreating operation of the machining electrode 18c may be performed simultaneously in both directions H and h, or first in the direction h and then in the direction H.

In the foregoing, the second-stage discharge machining involving the feeding of the electrode in the direction h has been described. However, the blade portion 10 can be formed in a desired direction by simultaneously performing the automatic servo driving of the machining table 25 (shown in FIGS. 4A and 4B) in the direction θ, or the automatic servo driving of the second machining head 16 in the direction h and the automatic servo driving of the machining table 25 in the direction θ, and by controlling the speeds of the respective automatic servo driving operations in the directions h and θ at the same speed or different speeds, depending on the desired direction. Needless to say, the interlocking operation of the automatic servo driving operation in the direction H and the automatic servo driving operations in the directions h and θ is performed in the same manner as described, referring to FIGS. 6A through 6C.

As described above, this invention makes it possible to manufacture a tire manufacturing mold consisting of a single block in which the contour surface, bone portions and blade portions thereof are integrally formed by first-stage and second-stage discharge machining operations, thus contributing to labor saving and cost reduction in the manufacture of tire manufacturing molds and making it possible to increase the strength of the blade portions of the molds.

What is claimed is:

1. A tire manufacturing mold consisting essentially of:
   a block having a curved contour surface extending circumferentially around the block and corresponding to an outer circumferential surface of a tire to be molded;
   a plurality of bone portions and a plurality of blade portions extending inwardly of the contour surface and circumferentially around a contour surface in repeating pattern with at least some blade portions having edges connected between spaced bone portions;
   the blade portions protruding essentially normally to the contour surface;
   each of the blade and bone portions being made as one unitary body with the block and formed by discharge machining the block in relief in a plurality of repeating arc sections around the contour surface of the block;
   there being no vertical gaps between edges of any blade and any bone portion, there being no gaps between any blade and the contour surface and there being no gaps between any bone and the contour surface;
   the blade portions each having a thickness of less than 1.5 mm and a height of more than 2 mm at at least one portion in a height direction thereof away from the contour surface; and
   at least some of the bone portions and the blade portions extending at a predetermined angle to the contour surface so that they contact the contour surface at a line contact with substantially no curved transition area between the at least some bone and blade portions and the contour surface.

2. A tire manufacturing mold as set forth in claim 1, wherein the blade portions are formed in such a manner that the width of a base portion and end portion thereof are substantially equal.

3. A tire manufacturing mold as set forth in claim 1, wherein the blade portions are formed in such a manner that the width of an end portion thereof is substantially smaller than the width of a base portion thereof.

4. A tire manufacturing mold as set forth in claim 1, wherein the blade portions are formed in such a manner that the width of an end portion thereof is substantially larger than the width of a base portion thereof.

* * * * *